A. WARNER.

Hubs for Vehicles.

No. 5,366. Reissued April 22, 1873.

Witnesses.

Jas. S. Wightman.

Anna M. Northrop

Inventor.

Almon Warner

By Thos. G. Hoo

Atty

THE NORRIS PETERS CO., PHOTO-LITHO., WASHINGTON, D. C.

UNITED STATES PATENT OFFICE.

ALMON WARNER, OF BELVIDERE, NEW JERSEY, ASSIGNOR, BY MESNE ASSIGNMENTS, TO ELIHU HALL & CO.

IMPROVEMENT IN HUBS FOR VEHICLES.

Specification forming part of Letters Patent No. 61,900, dated February 5, 1867; reissue No. 4,642, dated November 21, 1871; reissue No. 5,366, dated April 22, 1873; application filed July 1, 1872.

*To all whom it may concern:*

Be it known that I, ALMON WARNER, formerly of Hampden, in the State of Connecticut, now of Belvidere, in the State of New Jersey, have invented certain Improvements in Carriage-Wheels, of which the following is a specification:

*Nature and Object of the Invention.*

This invention relates to that class of carriage wheels which are made with a wooden hub surrounded by a metallic band, which is so constructed as to fit upon the hub near the middle thereof, and to give support outside of the hub to the spokes of the wheel. Said invention consists, in part, in the construction of the aforesaid band with continuous radial, or nearly radial, rings, having tapered mortises formed between them by means of webs or connecting-pieces extending from one to another of the said radial rings, and connecting the same together, substantially as hereinafter more fully set forth. Said invention consists, also, in part, in the combination of the band, constructed as above stated, with continuous radial, or nearly radial, rings and tapered mortises, a wooden hub or center of the wheel, and the spokes extending through the said tapered mortises and into the said hub, substantially as hereinafter more fully set forth. Said invention consists, also, in part, in the combination of the band aforesaid, constructed as above stated, with continuous radial, or nearly radial, rings and tapered mortises, a wooden hub or center, and spokes mortised into the wooden hub or center, substantially as hereinafter set forth. Said invention also consists, in part, in the combination, with the band constructed, as above stated, with continuous radial, or nearly radial, rings and tapered mortises, of the spokes and the wooden hub or center having tapered mortises also formed therein, substantially as hereinafter more fully set forth.

*Description of the Accompanying Drawing.*

Figure 1:
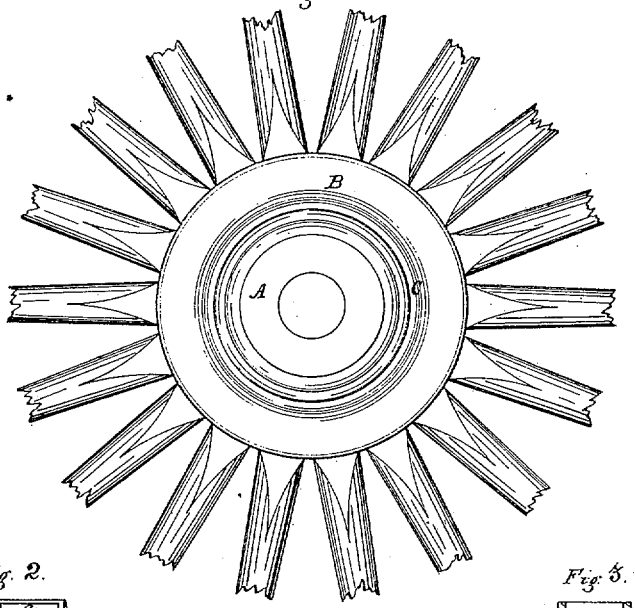
Figure 2:
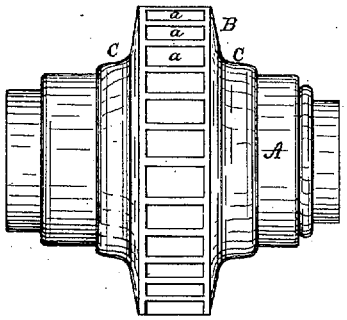
Figure 3:
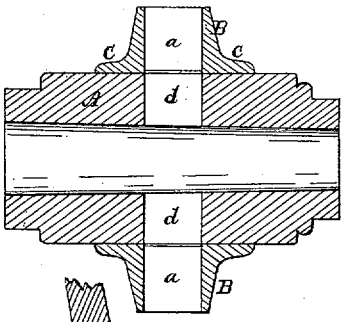
Figure 4:
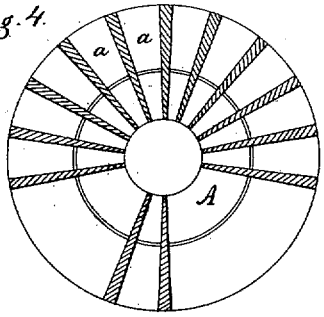
Figure 5:
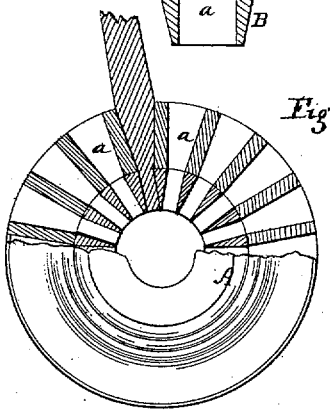

Figure 1 is a side view of the central portion of a carriage-wheel constructed according to the said invention. Fig. 2 is a side view of the wooden hub or center and the band containing the tapered mortises constructed according to the said invention. Fig. 3 is a longitudinal section of the same. Fig. 4 is a transverse sectional view, or partial sectional view, of the same, showing the mortises in the wooden hub or center, also tapered. Fig. 5 is a transverse sectional view, showing the mortises in the band tapered and the mortise in the wooden hub or center with parallel sides.

*General Description.*

A is the wooden hub, in which the axle-box is fitted in the usual manner. B B are rings of metal extending out radially, or nearly so, from the center, and connected together by webs or ribs formed between them, as shown, whereby tapered mortises *a a* are formed between the said rings and between the said webs or ribs, to receive and sustain the spokes outside of the hub. The said radial rings B B are also provided with flanges C C, which fit upon the wooden or central portion A, so as to sustain the rings B B in position. The rings B B and webs or ribs between them and the flanges C C should all be cast together in a single piece, and should be made of good and strong materials, so as to combine lightness with great strength. The spokes of the wheel, when in position, extend inwardly through the mortises *a a* into the wooden hub, and may enter either mortises *d d*, having parallel sides, in the said hub, as shown in Fig. 5, or tapered mortises, as shown in Fig. 4. The construction shown in Fig. 4 has, however, the advantage that each of the mortises in the hub forms with one of the mortises *a* in the band a continuous mortise, having a continuous and uniform taper throughout, so that no abrupt diminution of the size of this portion of the spoke, whereby it might be weakened, is necessary. The radial rings B B being continuous around the hub, and cast in one piece with the webs which divide the mortises from each other, gives great strength to the wheel, and when strain is thrown upon any one spoke, that portion of these rings upon which it bears is sustained and supported not only by the webs which unite them, but also by the remaining portion of these rings themselves; and, besides, this construction allows the spokes to be placed as nearly together as only the thickness of the single web interposed between each two spokes will admit, thus allowing the wheel to be made with a large number of spokes.

*Claims.*

I claim as my invention—

1. The band composed of the parts B and C and the webs which connect them, constructed substantially as hereinbefore described, whereby tapered mortises are formed between the said rings and the said webs, substantially as hereinbefore set forth.

2. The combination of the band hereinbefore described, having continuous radial rings and tapered mortises, with the hub *a* and spokes extending through the said tapered mortises into the said hub A, substantially as hereinbefore set forth.

3. The combination of the band hereinbefore described, having continuous radial rings and tapered mortises, the hub A, and spokes mortised into the said hub, substantially as hereinbefore set forth.

4. The combination of the band, having tapered mortises therein, with the hub A, also having tapered mortises, substantially as hereinbefore set forth.

ALMON WARNER.

Witnesses:
J. H. DRAKE,
J. HARRIS.